United States Patent [19]

Stoltman

[11] 3,958,604

[45] May 25, 1976

[54] CONTROL VALVE

[75] Inventor: Donald D. Stoltman, Henrietta, N.Y.

[73] Assignee: General Motors Corporation, Detroit, Mich.

[22] Filed: Jan. 14, 1974

[21] Appl. No.: 433,009

Related U.S. Application Data

[62] Division of Ser. No. 291,213, Sept. 22, 1972, Pat. No. 3,814,537.

[52] U.S. Cl. ............................. 138/46; 251/120; 251/298
[51] Int. Cl.² ................................. F16K 47/00
[58] Field of Search .......... 251/304, 120, 125, 117, 251/118, 298, 177, 228; 138/40, 43, 46; 137/802

[56] References Cited
UNITED STATES PATENTS

| | | | |
|---|---|---|---|
| 1,156,768 | 10/1915 | Fiechter | 251/120 X |
| 2,262,062 | 11/1941 | Strong | 251/298 |
| 3,054,426 | 9/1962 | Fritz et al. | 138/46 |
| 3,102,712 | 9/1963 | Zilk | 251/298 |
| 3,176,720 | 4/1965 | Donahue | 251/298 X |
| 3,286,731 | 11/1966 | Zajac | 138/46 X |
| 3,814,537 | 6/1974 | Stoltman | 415/36 |

*Primary Examiner*—Martin P. Schwadron
*Assistant Examiner*—Robert J. Miller
*Attorney, Agent, or Firm*—Paul Fitzpatrick

[57] ABSTRACT

A hydraulic position servo system includes a primary control valve moved by a mechanical input which embodies a pintle laterally shiftable in a cylinder to differentially throttle two orifices to establish a variable control pressure.

4 Claims, 2 Drawing Figures

CONTROL VALVE

This application is a division of my application Ser. No. 291,213 filed Sept. 22, 1972 now U.S. Pat. No. 3,814,537 for Turbine Nozzle Control, the disclosure of which is incorporated herein by reference.

My invention is directed to improvements in servomotor systems, particularly to a primary control valve.

Portions of the disclosure of the said application believed immaterial to understanding of the present invention are omitted from this specification in the interest of conciseness. If desired, this material may be ascertained from U.S. Patent No. 3,814,537.

My invention is directed to providing what I consider to be an improved primary control valve for a servomotor system having features of simplicity and reliability, as well as inexpensive production costs such as to make it highly suitable for use in automotive and other vehicle installations.

The principal object of my invention is to provide an improved turbine nozzle servomotor control valve.

The nature of my invention and its advantages will be clear to those skilled in the art from the succeeding detailed description of the preferred embodiment of the invention and the accompanying drawings thereof.

Figure 1:
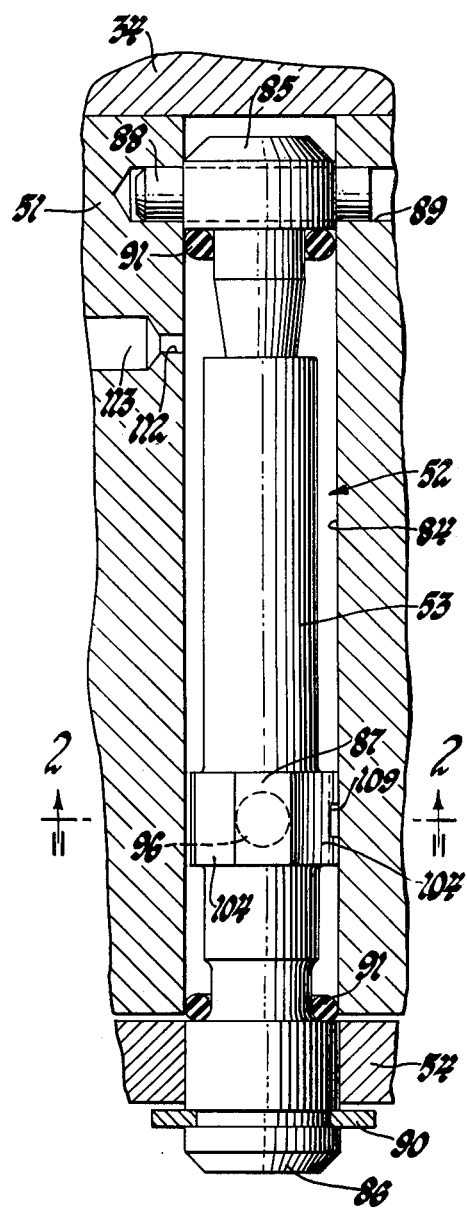
FIG. 1 is a longitudinal sectional view of a servo control valve.
Figure 2:
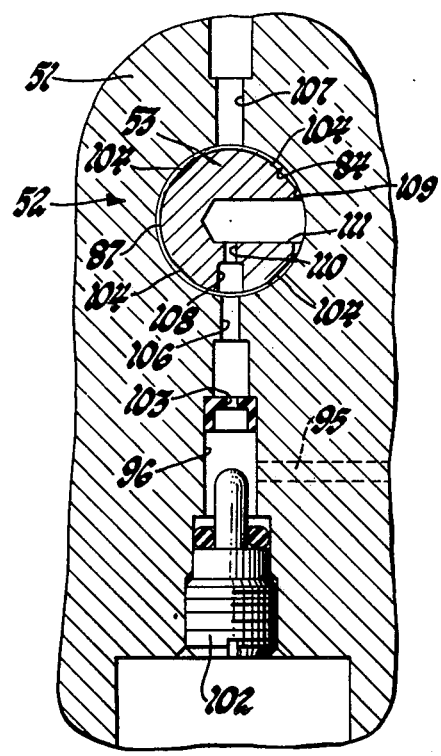
FIG. 2 is a cross sectional view of the valve taken on the plane indicated by the line 2—2 in FIG. 1.

Referring now to the servo valve assembly 52, a valve pin 53 is mounted in a straight bore 84 extending through a valve block 51 mounted on a support 34. The valve pin is generally of circular cross section, having heads 85 and 86 at the ends and having a land 87 near the head 86. The head 85 is of substantially the same diameter as the bore 84 but sufficiently smaller to allow the valve pin to pivot about this head as a center of rotation. A pivot pin 88 disposed in a bore 89 intersecting bore 84 at a right angle provides a fulcrum for the movement of valve pin 53 to effect its controlling action. The head 86 is disposed outside the valve block and includes a portion which fits within a bore in an input lever 54 which operates to move head 86 vertically as illustrated in FIG. 2, the lever being retained by a snap ring 90 mounted in a groove in the head 86. Fluid under pressure is contained within the bore 84 by O-rings 91 bearing against the heads of pin 53.

When servo oil under pressure is supplied to the servo valve 52 through a drilled passage 95, it conducts this oil to a stepped bore 96 within the valve block which is perpendicular to and intersects the bore 84 at valve pin land 87. The lower end of bore 96 is closed by a plug 102. A calibrated orifice 103 is seated against a step in the bore 96. Thus flow from a source (not illustrated) to valve 52 creates a pressure loss at the orifice 103.

The land 87 on valve pin 53 has four flats 104 which leave between them cylindrical surfaces at the top, bottom, and sides of the pin as is clearly shown in FIG. 2. Pin 53 is shown about four times size in the figures. The land 87 has about three thousandths inch radial clearance in bore 84. Thus, the land 87 can move down against the fluid inlet 106 from bore 96 or upwardly against an outlet bore 107 which is coaxial with bore 96. The valve pin 53 has a passage 108 aligned with inlet 106 extending into the valve pin, this passage being restricted at a second orifice 110. Flow through orifice 110 may be discharged through a relatively large lateral passage 111 in the valve pin which intersects passage 108 and discharges through a slot 109 into bore 84. Therefore, flow from 106 to 107 is throttled primarily at the inlet 106 as the valve pin moves downward in FIG. 2 or primarily at the outlet 107 as the valve pin moves upward in FIG. 2, and the two orifices or throttling ports are alternatively or reversely varied or obturated. The pressure between the two ports is thus varied by movement of the valve pin. This pressure, which may be called a control pressure, fills the bore 84 around the pin 53. The control pressure is a function of the drop through orifice 103 and, in some positions of pin 53, also orifice 110. The control pressure is communicated from bore 84 through a damping orifice 112 and a bored passage 113 to a controlled device, specifically a slave valve (not illustrated).

It may be noted that O-ring 91 is believed to assist in centering valve pin 53; that is, contributing some bias away from its limit positions where land 87 engages the surface of bore 84. When servo fluid is supplied through passage 95 and exhausted through bore 107, the pressure in passage 111 communicated to a controlled device is related to the inlet and outlet pressures as a function of the vertical displacement (as illustrated in FIG. 2) of the valve pin 53. The valve 52 thus provides a means for modulating a control pressure to govern the operation of a hydraulic servomotor as disclosed in my parent application (now Pat. No. 3,814,537).

Operation of the Valve

Oil flows to the valve 52 through passage 106 and is exhausted through passage 107. Valve land 87 is movable through a small distance to engage the wall of bore 84 at either passage, thus resisting inflow through passage 106 directly into the bore 84 or outflow from the bore through passage 107, and accordingly varying the pressure in bore 84. When land 87 engages the mouth of passage 106, flow may proceed through the restricted passage 108, 110, 111 to the outlet 107, so the pressure is reduced by drop in the orifice 110. The pressure in bore 84 is communicated through passage 113 to a device controllable in response to the value of this pressure.

I believe it will be apparent to those skilled in the art from the foregoing that I have devised a novel, flexible, and very simple pilot valve for servomotor control.

The detailed description of the preferred embodiment of the invention for the purpose of explaining the principles thereof is not to be considered as limiting or restricting the invention, since many modifications may be made by the exercise of skill in the art.

I claim:

1. A control valve comprising a cylinder; a valve pin disposed in the cylinder; means defining a fulcrum on the valve pin transverse to the cylinder; the valve pin having a zone spaced lengthwise of the pin from the fulcrum having a small clearance from the cylinder; the cylinder defining opposed fluid inlet and outlet ports aligned with said zone disposed so as to be restrictable reversely by rotation of the valve pin about the fulcrum; means within the valve pin for defining a restricted passage threrethrough aligned with one of said ports; means defining a passage communicating with the said restricted passage and leading through said clearance and the other of said ports and also to a pressure connection extending exteriorly of the cylinder so that the pressure in the pressure connection is a function of rotation of the valve pin about the said fulcrum; and means for rotating the valve pin about the said fulcrum.

2. A control valve comprising a cylinder; a valve pin disposed in the cylinder and having an actuatable end extending from one end of the cylinder; means defining a fulcrum on the valve pin transverse to the cylinder; an O-ring seal disposed between the valve pin and cylinder adjacent the actuatable end; the valve pin having a land spaced lengthwise of the pin from the fulcrum having a small clearance from the cylinder; the cylinder defining opposed fluid inlet and outlet ports aligned with the land and in communication with said clearance so as to be restrictable reversely by rotation of the valve pin about the fulcrum; and means defining an external pressure connection from the cylinder spaced axially of the pin from the land and means for communicating said inlet with said outlet across said clearance and also communicating said inlet with said external pressure connection to control pressure therein in accordance with the position of said valve pin.

3. A control valve comprising a cylinder; a valve pin disposed in the cylinder; means defining a fulcrum on the valve pin transverse to the cylinder; the valve pin having a zone spaced lengthwise of the pin from the fulcrum having a small clearance from the cylinder; the cylinder defining opposed fluid inlet and outlet ports aligned with said zone and disposed in communication with said clearance so as to be restrictable reversely by rotation of the valve pin about the fulcrum; means within the valve pin for defining a restricted passage therethrough aligned with one of said ports means defining a passage in communication with the other of said ports, through said clearance, means forming a pressure connection communicating through the cylinder with the said restricted passage and extending exteriorly of the cylinder so that the pressure in the pressure connection is a function of rotation of the valve pin about the said fulcrum; and means for rotating the valve pin about the said fulcrum.

4. A control valve comprising a cylinder; a valve pin disposed in the cylinder and having an actuatable end extending from one end of the cylinder; means defining a fulcrum on the valve pin transverse to the cylinder; the valve pin having a zone spaced lengthwise of the pin from the fulcrum having a small clearance from the cylinder; the cylinder defining opposed fluid inlet and outlet ports aligned with the said zone in communication with said clearance so as to be restrictable reversely by rotation of the valve pin about the fulcrum; a restricted passage in said valve pin registering with one of said ports and communicating with the other of said ports across said clearance and also with the interior of the cylinder; and means defining an external pressure connection from the cylinder for transmitting the pressure within the cylinder resulting from throttling of fluid flow by the pin at the said ports and through the said restricted passage.

* * * * *